United States Patent
Bang et al.

(10) Patent No.: US 11,377,106 B2
(45) Date of Patent: Jul. 5, 2022

(54) CONTROL METHOD FOR ISG OF VEHICLE EQUIPPED WITH MANUAL TRANSMISSION

(71) Applicants: HYUNDAI MOTOR COMPANY, Seoul (KR); KIA MOTORS CORPORATION, Seoul (KR)

(72) Inventors: Jung Hwan Bang, Seoul (KR); Young Ho Jung, Seoul (KR); Tae Suk Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 175 days.

(21) Appl. No.: 16/823,933

(22) Filed: Mar. 19, 2020

(65) Prior Publication Data

US 2021/0024071 A1 Jan. 28, 2021

(30) Foreign Application Priority Data

Jul. 24, 2019 (KR) .................. 10-2019-0089309

(51) Int. Cl.
*B60W 30/18* (2012.01)
*B60W 10/02* (2006.01)
(Continued)

(52) U.S. Cl.
CPC ...... *B60W 30/18018* (2013.01); *B60W 10/02* (2013.01); *B60W 10/06* (2013.01);
(Continued)

(58) Field of Classification Search
CPC .......... B60W 30/18018; F02N 11/0814–0844; F02D 41/06–065; F02D 41/123; F02D 41/126
(Continued)

(56) References Cited

U.S. PATENT DOCUMENTS 4,500,794 A * 2/1985 Hamano ............. F02N 11/0818
290/38 C
6,371,889 B1 4/2002 Kuroda et al.
(Continued)

FOREIGN PATENT DOCUMENTS

DE 10 2004 024 213 B4 12/2005

OTHER PUBLICATIONS

European Search Report dated Jul. 30, 2020 from the corresponding European Application No. 20164845.8, 6 pp.

*Primary Examiner* — Robert A Werner
(74) *Attorney, Agent, or Firm* — Lempia Summerfield Katz LLC

(57) ABSTRACT

An idle stop and go (ISG) control method for a vehicle provided with a manual transmission includes: determining, by a controller, whether a first operation determination condition is satisfied based on a bottom signal from a clutch pedal sensor, a brake pedal operation signal, and a first vehicle speed signal condition; determining, by the controller, whether a second operation determination condition is satisfied based on the bottom signal, the brake pedal operation signal, and a second vehicle speed signal condition; stopping, by the controller, an engine of the vehicle when the first operation determination condition or the second operation determination condition is satisfied; determining, by the controller, whether a first restart condition is satisfied based on a top signal or the bottom signal from the clutch pedal sensor; and restarting, by the controller, the engine when the first restart condition is satisfied.

13 Claims, 4 Drawing Sheets

(51) Int. Cl.
    *B60W 10/06* (2006.01)
    *F02D 41/06* (2006.01)
(52) U.S. Cl.
    CPC ........... *F02D 41/06* (2013.01); *F02D 41/065* (2013.01); *B60W 2520/04* (2013.01); *B60W 2540/12* (2013.01); *B60W 2540/14* (2013.01)
(58) Field of Classification Search
    USPC .................... 701/112, 113; 123/179.3, 179.4
    See application file for complete search history.

(56) References Cited

U.S. PATENT DOCUMENTS

| | | | |
|---|---|---|---|
| 6,504,259 B1* | 1/2003 | Kuroda | B60K 6/543 |
| | | | 290/40 C |
| 2012/0150406 A1* | 6/2012 | Tomura | B60W 30/18018 |
| | | | 701/70 |
| 2012/0271508 A1* | 10/2012 | Kanemoto | F02N 11/101 |
| | | | 701/33.6 |
| 2013/0124072 A1* | 5/2013 | Hirano | F02N 11/0833 |
| | | | 701/112 |
| 2014/0088853 A1* | 3/2014 | Christen | F02N 11/103 |
| | | | 701/112 |
| 2015/0166042 A1* | 6/2015 | Kitahata | B60K 6/445 |
| | | | 180/65.265 |
| 2015/0167614 A1 | 6/2015 | Malone et al. | |
| 2015/0361910 A1 | 12/2015 | Ko et al. | |
| 2017/0267243 A1* | 9/2017 | Chang | B60W 10/184 |
| 2019/0186451 A1 | 6/2019 | Bang et al. | |

\* cited by examiner

CONTROL METHOD FOR ISG OF VEHICLE EQUIPPED WITH MANUAL TRANSMISSION

CROSS-REFERENCE TO RELATED APPLICATION

This application claims priority to and the benefit of Korean Patent Application No. 10-2019-0089309, filed on Jul. 24, 2019, the entire contents of which are incorporated herein by reference.

FIELD

The present disclosure relates to a control method for an idle stop and go (ISG) of a vehicle equipped with manual transmission.

BACKGROUND

The statements in this section merely provide background information related to the present disclosure and may not constitute prior art.

Efforts have been made worldwide to reduce carbon dioxide generated by combustion of a fuel in vehicles and to improve fuel efficiency of vehicles as oil prices increase.

An idle stop and go (ISG) system has been developed to meet these goals. It has been proven that the ISG system can reduce an amount of carbon dioxide generated in the vehicle and can improve fuel efficiency.

The ISG system is an engine control system that stops or turns off an engine of a vehicle to prevent the engine from operating when the vehicle decelerates or stops. The ISG system starts the engine again to enable the vehicle to move when desired to accelerate the vehicle.

The ISG system uses information such as the vehicle speed, the engine speed, and the engine coolant temperature to stop the engine when the engine is idling. In other words, the ISG system automatically stops the idling engine when the vehicle decelerates or stops, such as at a traffic signal, and restarts the engine to start the vehicle after a predetermined time. The ISG system may also be expressed as an idling stop control device. The ISG system can improve fuel economy by about 5 to 15% in a fuel economy mode. A vehicle equipped with the ISG system is referred to as an ISG vehicle.

Because the ISG system prevents the engine from operating when the vehicle decelerates or stops, fuel is not consumed. Thus, the fuel efficiency of the vehicle can be improved and carbon dioxide is not discharged.

However, we have discovered that the currently applied ISG system operates at a vehicle speed of about 5 kph or less, so the fuel consumption effect is limited.

In addition, the vehicle may not enter the ISG (Idle Stop & Go) state when a clutch pedal is pressed while a transmission gear is engaged during deceleration of the vehicle.

The above information disclosed in this Background section is only for enhancement of understanding of the background of the present disclosure and therefore it may contain information that does not form the prior art that is already known to a person of ordinary skill in the art.

SUMMARY

The present disclosure provides a control method for an ISG of a vehicle equipped with a manual transmission, which may extend engine stopping.

In one form of the present disclosure, an idle stop and go (ISG) control method for a vehicle provided with a manual transmission may include: determining, by a controller, whether a first operation determination condition is satisfied based on a bottom signal from a clutch pedal sensor, a brake pedal operation signal, and a first vehicle speed signal condition; determining, by the controller, whether a second operation determination condition is satisfied based on the bottom signal from the clutch pedal sensor, the brake pedal operation signal, and a second vehicle speed signal condition; stopping, by the controller, an engine of the vehicle, by the controller, when the first operation determination condition or the second operation determination condition is satisfied; determining, by the controller, whether a first restart condition is satisfied based on a top signal or the bottom signal from the clutch pedal sensor; and restarting, by the controller, the engine by driving an operating motor connected with the engine when the first restart condition is satisfied.

The ISG control method may further include: determining, by the controller, whether a second restart condition is satisfied based on an engagement signal from the clutch pedal sensor, and restarting the engine by the controller by operating an injector of the engine when the second restart condition is satisfied.

The first vehicle speed signal condition may be satisfied when a current vehicle speed of the vehicle is lower than a predetermined first vehicle speed, and a recorded vehicle speed of the vehicle is higher than a predetermined second vehicle speed which is higher than the first vehicle speed.

The second vehicle speed signal condition may be satisfied when the current vehicle speed is lower than a predetermined third vehicle speed which is lower than the first vehicle speed, and the recorded vehicle speed is higher than a predetermined fourth vehicle speed which is higher than the third vehicle speed.

The ISG control method may further include detecting, by the controller, whether a transmission stage of the manual transmission is a neutral stage or a driving stage.

In the driving stage, the first restart condition may be satisfied when the bottom signal from the clutch pedal sensor is output, and the transmission stage of the manual transmission is changed to the neutral stage and then changed to the driving stage.

In the neutral stage, the first restart condition may be satisfied when the bottom signal from the clutch pedal sensor is output, and the transmission stage of the manual transmission is changed to the driving stage.

The first restart condition may be satisfied when the bottom signal from the clutch pedal sensor is output, and a brake pedal release signal is received.

In the driving stage, the first restart condition may be satisfied when the transmission stage of the manual transmission is changed to the neutral stage and then the signal of the clutch pedal sensor is turned off and a top signal of the clutch pedal sensor is output.

In a state that the transmission stage of the manual transmission is the neutral stage, the first restart condition may be satisfied when the bottom signal from the clutch pedal sensor is turned off and the top signal from the clutch pedal sensor is output.

In the driving stage, the first restart condition may be satisfied when the bottom signal from the clutch pedal sensor is turned off while the top signal from the clutch pedal sensor is output, and then the bottom signal from the clutch pedal sensor is output.

In the neutral stage, the first restart condition may be satisfied when the vehicle stops, the transmission stage of the manual transmission is changed to the drive stage, and the bottom signal from the clutch pedal sensor is output.

In the driving stage, the second restart condition may be satisfied when an engine rpm (revolutions per minute) is higher than a predetermined rpm and a signal from the clutch pedal sensor is in off.

The control method for an ISG of a vehicle equipped with a manual transmission may improve fuel consumption of the vehicle by increasing the engine stopping interval relatively regardless of whether the manual transmission shift stage is engaged.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
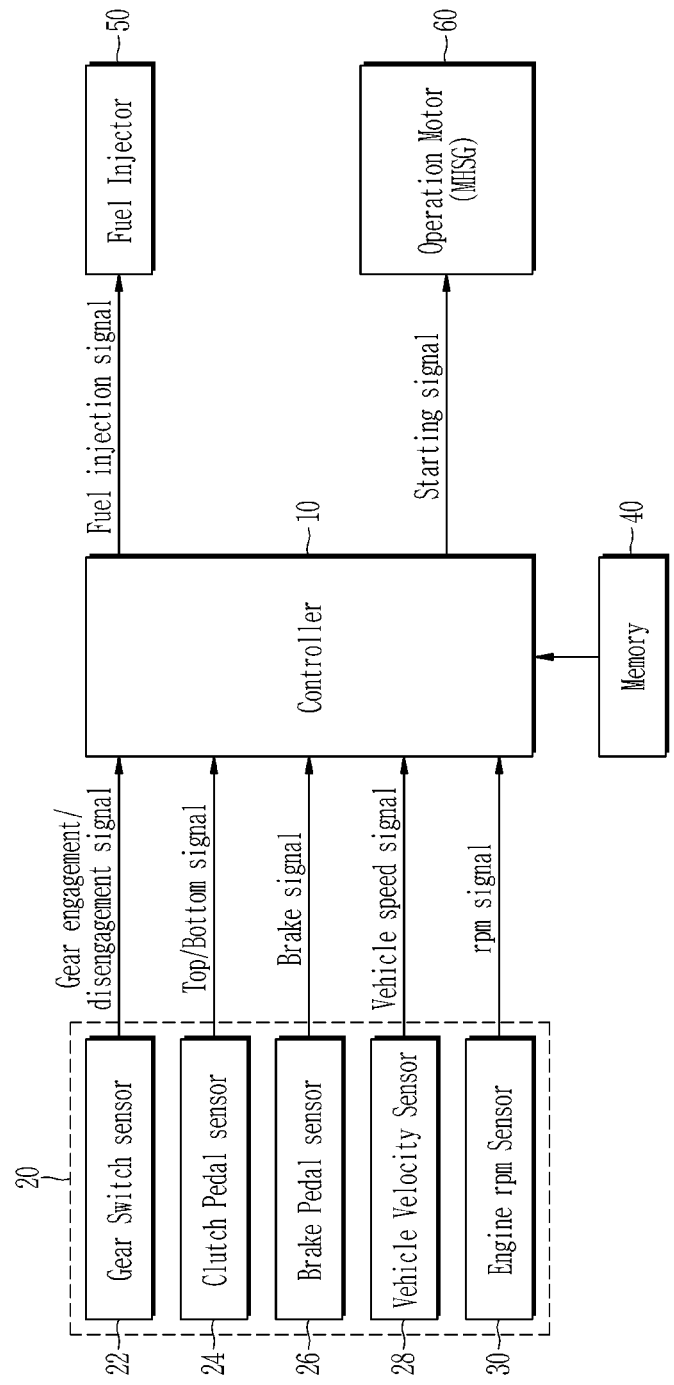
FIG. 1 is a block diagram of a vehicle provided with a manual transmission of which an ISG control method is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to better understand the present disclosure and the object achieved by the forms of the present disclosure, the accompanying drawings illustrating forms of the present disclosure and contents described in the accompanying drawings are to be referenced.

In describing the present disclosure, if it is determined that the detailed description of the related known configuration or function may obscure the gist of the present disclosure, the detailed description thereof will be omitted.

The terminology used herein is for the purpose of describing particular example forms only and is not intended to be limiting of the present disclosure. Singular expressions include a plurality of expressions unless the context clearly indicates otherwise. It should be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification, including technical and scientific terms, have the same meanings as those that are generally understood by those having ordinary skill in the art. It should be understood that the terms defined by the dictionary are identical with the meanings within the context of the related art. Such terms should not be ideally or excessively formally defined unless the context clearly dictates otherwise.

The constituent elements or "units" or blocks or modules used in an exemplary form of the present disclosure are software such as tasks, classes, subroutines, processes, objects, threads of execution, and programs performed in a given area of memory. It may be implemented in hardware, such as software, field-programmable gate arrays (FPGAs), or application-specific integrated circuits (ASICs), or may be a combination of the software and hardware. The constituent elements or '-parts' may be included in a computer-readable storage medium, or a part of them may be distributed in a plurality of computers.

Figure 2:
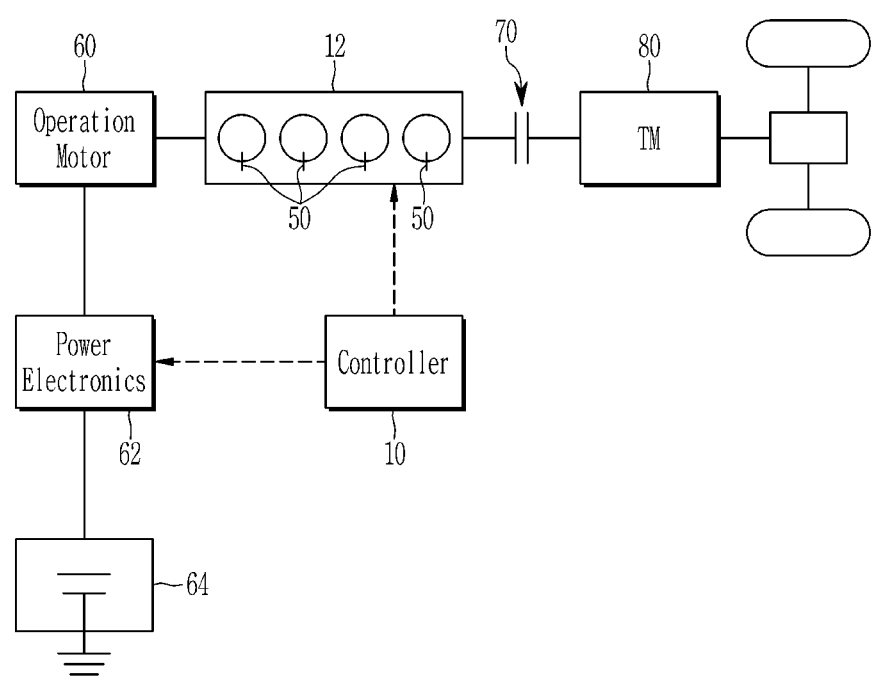
FIG. 2 is a drawing showing a vehicle provided with a manual transmission of which an ISG control method is applied.

FIG. 1 is a block diagram of a vehicle provided with a manual transmission of which an ISG control method according to an exemplary form of the present disclosure may be applied, and FIG. 2 is a drawing showing a vehicle provided with a manual transmission of which an ISG control method according to an exemplary form of the present disclosure may be applied.

Referring to FIG. 1 and FIG. 2, a vehicle provided with a manual transmission of which an ISG control method may be applied may include a vehicle operation status detector 20, which measures various states of the vehicle and outputs a corresponding signal, an injector 50 for injecting fuel into an engine 12, an operating motor 60 connected with the engine 12 for selectively starting the engine 12, a controller 10 for controlling operations of the injector 50 and the operating motor 60 according to an output signal of the vehicle operation status detector 20, and a memory 40 communicate with the controller 10.

The controller 10 may be, for example, a microprocessor (e.g., an ECU (Engine Control Unit or Electronic Control Unit) or hardware including at least one microprocessor operated by a program. And the program may include a series of instructions for performing a control method of a vehicle including an ISG function according to one form of the present disclosure. The program may be stored in the memory 40.

The vehicle operation status detector 20 may include a transmission sensor 22 detecting whether transmission stage of manual transmission is engaged (a neutral stage or a driving stage) and outputs a corresponding signal, a clutch pedal sensor 24 detecting an operation of a clutch pedal and outputs corresponding signal, a brake pedal sensor 26 detecting an operation of a brake pedal and output a corresponding signal, a vehicle speed sensor 28 measuring vehicle speed and outputs a corresponding signal, and a rpm sensor 30 measuring rpm of the engine 12 and outputs a corresponding signal.

The vehicle equipped with a manual transmission of which an ISG (Idle Stop and Go) function according to one exemplary form of the present disclosure may be applied includes: a motor controller 62 controlling an operation of the operating motor 60, a battery 64, a manual transmission 80 and a clutch 70 selectively connecting the engine 12 and the manual transmission 80.

The battery 64 may be a general 12V battery, or a 48V battery for a mild hybrid, or a 12V battery and a 48V battery.

The operating motor 60 is connected with the engine 12 via a gear or belt, and may be a starter motor applied to a general engine, or a MHSG (Mild Hybrid Starter & Generator) which may start the engine 12, assist the engine 12 or convert rotational energy of the engine 12 into electrical energy.

That is, depending on the running state of the vehicle, the operating motor 60 may be operated as an engine starting mode and an engine torque auxiliary mode that operates as a motor to assist the torque of the engine 12. Also, the operating motor 60 may be operated as a mode that supplies power to the vehicle's electrical load and charges a 48 volt battery that charges a 12 volt battery connected to a 48 volt battery through a low voltage DC-DC converter (LDC), as a regenerative braking mode to charge 48 (volt) battery, and as a coasting driving mode to extend travel distance. Thus, the operating motor 60 may be optimally controlled according to the running state of the vehicle to improve or maximize the fuel efficiency of the vehicle.

The motor controller 62 may be powered by the battery 64 as an inverter and/or converter to drive the operating motor 60 or transfer electricity generated from the operating motor 60 to the battery 64.

The transmission sensor 22 detects whether the transmission 80 is neutral or engaged, that is a driving stage, and outputs a corresponding signal.

The clutch pedal sensor 24 may include one or more sensors that output a signal when the clutch pedal is not stepped on, the clutch pedal is stepped on, and the clutch pedal is fully stepped on.

The clutch pedal sensor 24 outputs a clutch engage signal when the clutch pedal is not pressed, outputs a top signal when the clutch is in the depression state, and outputs a bottom signal when the clutch pedal is in the fully depression state.

In other words, the clutch pedal sensor 24 may output the top signal when the clutch is in a depression state and output the bottom signal when the clutch is fully depressed. And if the clutch pedal is not pressed, the output signal is off. In this case, it is defined as clutch engage signal generation even when there is no output signal because the clutch pedal is not stepped on.

The Top signal may indicate that the driver is stepping on the clutch pedal, and the Bottom signal may be defined as the signal generated when the driver fully presses the clutch pedal.

The vehicle speed sensor 28 measures a current vehicle speed and outputs the corresponding signal, and the memory 40 records and stores the vehicle speed while driving (Velocity history).

Figure 3A:
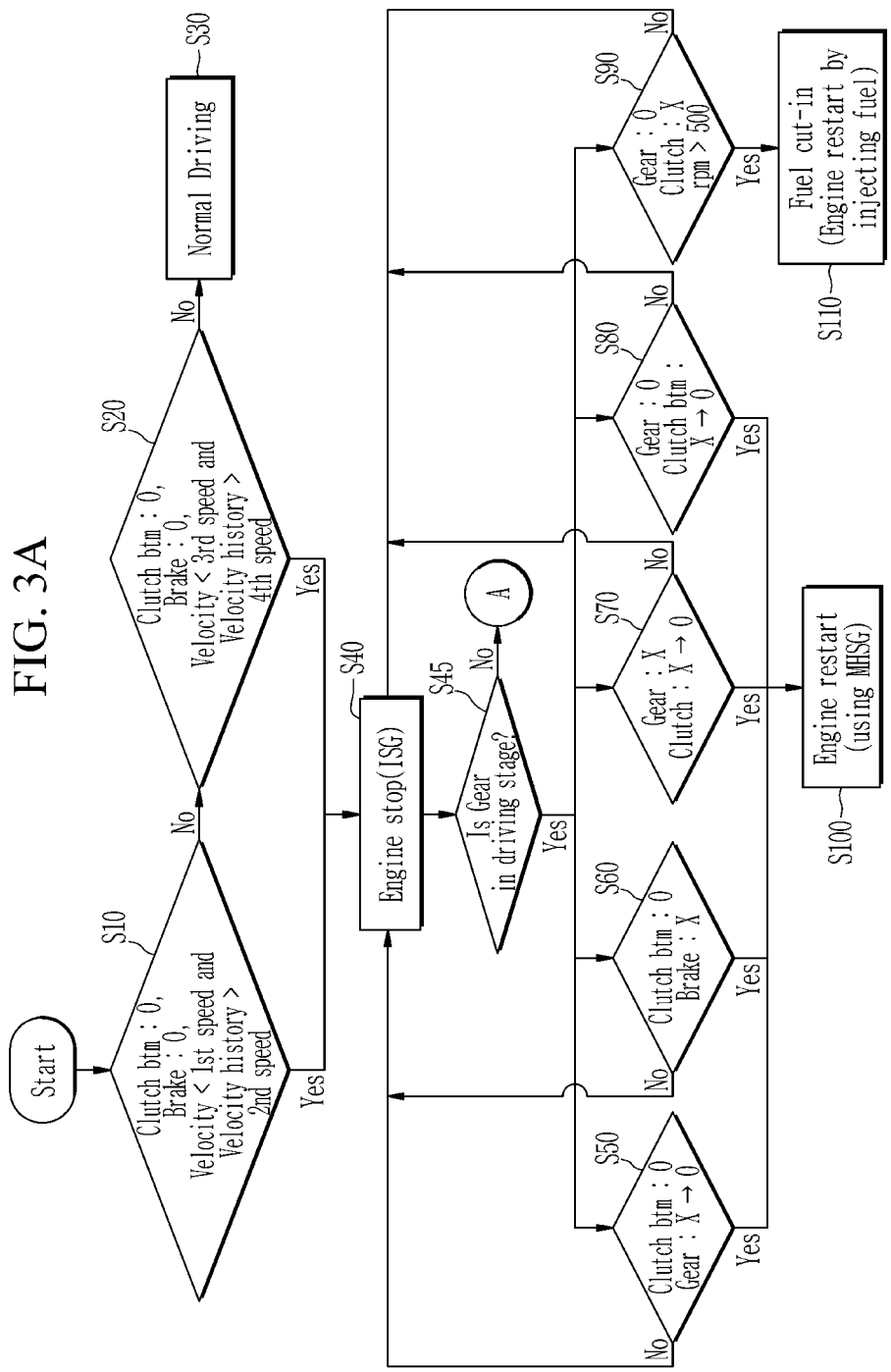
FIG. 3A and FIG. 3B are flowcharts showing an ISG control method for a vehicle provided with a manual transmission.
Figure 3B:
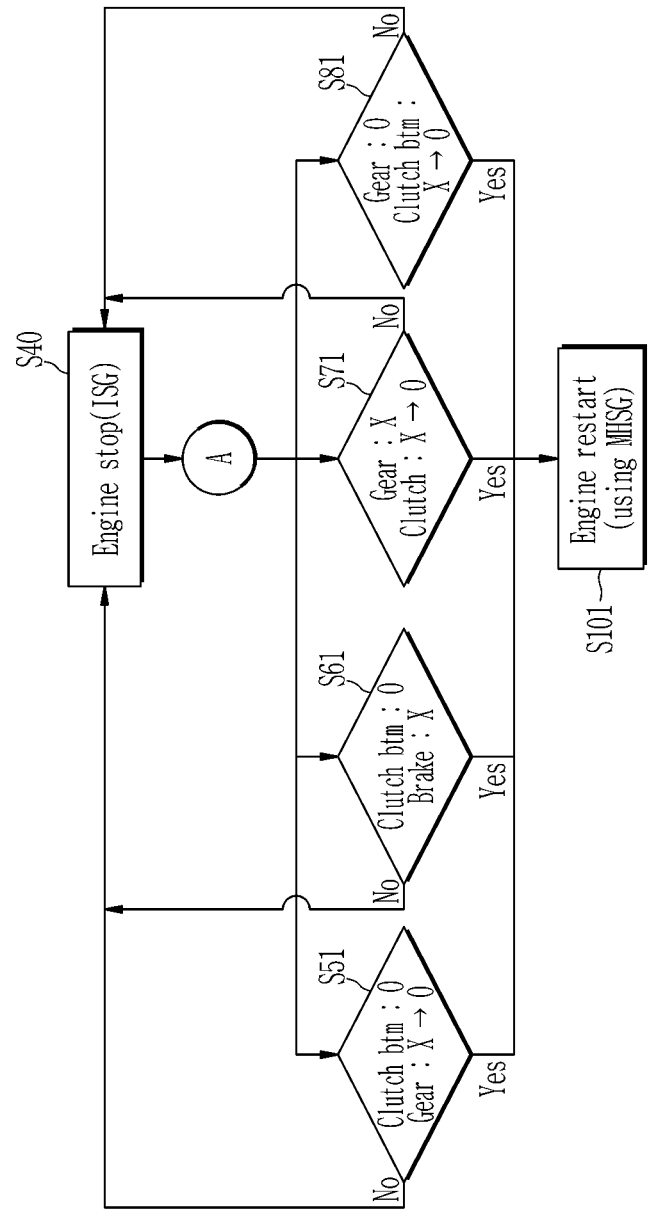

FIG. 3A and FIG. 3B are flowcharts showing an ISG control method according to an exemplary form of the present disclosure for a vehicle provided with a manual transmission.

Referring to FIG. 1 to FIG. 3A and FIG. 3B, an ISG control method according to an exemplary form of the present disclosure for a vehicle provided with a manual transmission will be described.

The controller 10 may stop the engine 12 (S40) by controlling an operation of the injector 50 according to the output signal of the vehicle operation status detector 20 when a first operation condition is satisfied (S10) or a second operation condition is satisfied (S20).

The controller 10 determines that the first operation condition is satisfied when the clutch pedal is fully released, that is, the clutch pedal sensor 24 outputs a bottom signal, the brake pedal is operated according to the output signal of the brake pedal sensor 26, and a first vehicle speed signal condition is satisfied (S10). And then, the controller 10 may stop the engine 12 (S40).

The first vehicle speed signal condition may be satisfied when a current vehicle speed (Velocity) is lower than a predetermined first vehicle speed according to the output signal of the vehicle speed sensor 28 and a recorded vehicle speed (Velocity history) recorded in the memory 40 is higher than a predetermined second vehicle speed higher than the first vehicle speed.

For example, the first vehicle speed may be 25 kph, and the second vehicle speed may be 30 kph, but is not limited thereto. The first vehicle speed and the second vehicle speed may be variously set according to the weight of the vehicle, the driving condition, and the like.

That is, if a driver has fully pressed the clutch (Bottom switch ON), the brake is operated, the vehicle has traveled more than 30 kph, and the current vehicle speed is less than 25 kph, the controller 10 determines that the driver intends to decelerate the vehicle. In this case, the controller 10 stops the engine 12 to enter a coasting mode (S40).

The controller 10 determines that the second operation condition is satisfied when the clutch pedal is fully released, that is, the clutch pedal sensor 24 outputs a bottom signal, the brake pedal is operated according to the output signal of the brake pedal sensor 26, and a second vehicle speed signal condition is satisfied (S20). And then, the controller 10 may stop the engine 12 (S40).

The second vehicle speed signal condition may be set lower than the first vehicle speed signal condition.

That is, the second vehicle speed signal condition may be satisfied when a current vehicle speed (Velocity) is lower than a predetermined third vehicle speed which is lower than the first vehicle speed according to the output signal of the vehicle speed sensor 28, and a recorded vehicle speed (Velocity history) recorded in the memory 40 is higher than a predetermined fourth vehicle speed which is higher than the third vehicle speed.

For example, the third vehicle speed may be 5 kph, and the fourth vehicle speed may be 7 kph, but is not limited thereto. The third vehicle speed and the fourth vehicle speed may be variously set according to the weight of the vehicle and the driving condition.

That is, if the driver has completely pressed the clutch (Bottom switch ON), the brake is operated, the vehicle has traveled more than 7 kph, and the current vehicle speed is less than 5 kph, the controller 10 determines that the driver intends to decelerate the vehicle. In this case, the controller 10 stops the engine 12 to enter the coasting mode (S40).

A typical ISG system operates at a vehicle speed of approximately 5 kph or less, which limits fuel consumption. However, the ISG control method of a vehicle equipped with a manual transmission according to an exemplary form of the present disclosure stops the engine 12 regardless of whether the shift stage is engaged, thereby extending the operation time and distance of the coasting mode. In other words, ISG operation is extended to improve fuel consumption.

The controller 10 controls the vehicle in the normal vehicle driving mode (Normal Driving) if both the first and second operation determination conditions are not satisfied according to the output signal of the vehicle operation status detector 20 (S30).

After the ISG function is implemented and the engine 12 stops, the vehicle may be switched back to driving mode at the driver's willingness to drive.

The controller 10 determines whether a first restart condition including a top signal generation or a bottom signal generation of the clutch pedal sensor 24 is satisfied according to the output signal of the vehicle operation status detector 20 (S50, S51, S60, S61, S70, S71, S80, S81). And if the first restart condition is satisfied, the controller 10 restarts the engine 12 by driving the operating motor 60 connected with the engine 12 (S100 and S101).

The controller 10 determines whether s second restart condition including an engagement signal generation of the clutch pedal sensor 24 is satisfied according to the output signal of the vehicle operation status detector 20 (S90). And if the second restart condition is satisfied, the controller 10 activates the injector 50 to inject fuel to restart the engine 12 (S100).

Here, the engagement signal generation of the clutch pedal sensor 24 is a concept including not only generation of a predetermined engage signal of the clutch pedal sensor 24 but also a state in which a top signal or a bottom signal is not generated.

In this case, the restarting the engine 12 by driving the operating motor 60 means restarting the engine 12 by driving the operating motor 60 together with the fuel injection of the injector 50.

In this case, the restarting the engine 12 by operating the injector 50 means restarting the engine 12 without running the operating motor 60.

When the engine 12 is stopped (S40), the controller 10 detects whether the transmission stage of the manual transmission 80 is neutral stage or driving stage based on the output signal of the transmission sensor 22 (S45).

After the engine 12 stops, in a state that the transmission stage of the manual transmission 80 is the driving stage, if the bottom signal of the clutch pedal sensor 24 is output, that means the clutch is completely disengaged, and the transmission stage of the manual transmission 80 is changed to the neutral stage and then changed to the driving stage according to the output signal of the vehicle operation status detector 20 (S50), then the controller 10 determines that the first restart condition is satisfied and restarts the engine 12 by running the operating motor 60 (S100).

In other word, when the bottom signal of the clutch pedal sensor 24 and the engage signal of the transmission sensor 22 occur, the controller 10 determines that the driver intends to drive the vehicle and restarts the engine 12 by running the operating motor 60 (S100).

If the ISG function is activated (S40) while the transmission stage of the manual transmission 80 is the driving stage, the controller 10 determines whether the transmission stage of the manual transmission 80 is changed to the neutral stage and then changed to the driving stage according to the output signal of the vehicle operation status detector 20 (S50), then the controller 10 restarts the engine 12 by running the operating motor 60 (S100) when the transmission stage of the manual transmission 80 is changed to the neutral stage and then changed to the driving stage.

At this time, the clutch is fully depressed, that is, the bottom switch ON is maintained.

After the ISG function is activated to stop the engine 12 in S40, in a state that the transmission stage of the manual transmission 80 is the neutral stage (A), as shown in FIG. 3B, the controller 10 determines whether the transmission stage of the manual transmission 80 is changed from the neutral stage to the driving stage (S51). And if the transmission stage of the manual transmission 80 is changed from the neutral stage to the driving stage, the controller 10 determines that the first restart condition is satisfied and restarts the engine 12 by running the operating motor 60 (S101).

In other word, when the bottom signal of the clutch pedal sensor 24 and the engage signal of the transmission sensor 22 occur, the controller 10 determines that the driver intends to drive the vehicle and restarts the engine 12 by running the operating motor 60 (S100).

After the engine 12 stops (S40), the controller 10 determines that the first restart condition is satisfied if the clutch is fully released and the brake pedal is released according to the output signal of the vehicle operation status detector 20 (S60 and S61), and restarts the engine 12 by running the operating motor 60 (S100 and S101).

That is, when the bottom signal of the clutch pedal sensor 24 is output, and release signal of the brake pedal sensor 26 occurs, the controller 10 determines that the driver intends to drive the vehicle and restarts the engine 12 by running the operating motor 60 (S100 and S101).

In this case, the operating motor 60 is driven in the same manner as the shift stage of the manual transmission 80 is neutral or engaged.

In a state that the transmission stage of the manual transmission 80 is the driving stage when the ISG function is activated to stop the engine 12 in S40, the controller 10 determines whether the transmission stage of the manual transmission is changed to the neutral stage and the clutch depression signal occurred after the clutch engage signal (S70), and then the controller 10 determines that the first restart condition is satisfied and restarts the engine 12 by running the operating motor 60 if the transmission stage of the manual transmission 80 is changed to the neutral stage and the clutch depression signal occurred after the clutch engage signal (S100).

In other word, when the signal of the clutch pedal sensor 24 is turned off and then a top signal of the clutch pedal sensor 24 occurs, the controller 10 determines that the driver intends to drive the vehicle and restarts the engine 12 by running the operating motor 60 (S100).

After the ISG function is activated to stop the engine 12 in S40, in a state that the transmission stage of the manual transmission 80 is the neutral stage (A), as shown in FIG. 3B, the controller 10 determines whether the clutch is released after engage (S71). And if the clutch is released after engage, the controller 10 determines that the first restart condition is satisfied and restarts the engine 12 by running the operating motor 60 (S101).

If the top signal occurs after the signal of the transmission sensor 22 is turned off and the top signal of the clutch pedal sensor 24 is turned off, t the controller 10 determines that the driver intends to drive the vehicle and restarts the engine 12 by running the operating motor 60 (S101).

In a state that the transmission stage of the manual transmission 80 is the driving stage when the ISG function is activated to stop the engine 12 in S40, the controller 10 determines whether the clutch is completely released after engaged (S80), and if the clutch is completely released after engaged while the transmission stage of the manual transmission 80 is the driving stage, the controller 10 restarts the engine 12 by running the operating motor 60 (S100).

The controller 10 determines that the first restart condition is satisfied when the bottom signal of the clutch pedal sensor 24 occurs after the bottom signal of the clutch pedal sensor 24 is turned off while the top signal of the clutch pedal sensor 24 is on.

That is, if the driver slightly releases clutch pedal and then presses clutch pedal again, the controller 10 determines that the driver intends to drive the vehicle and restarts the engine 12 by running the operating motor 60 (S100).

After the ISG function is activated to stop the engine 12 in S40, in a state that the transmission stage of the manual transmission 80 is the neutral stage (A), as shown in FIG. 3B, the controller 10 determines whether the vehicle stops, the transmission stage of the manual transmission 80 is changed from the neutral stage to the drive stage, and a bottom signal of the clutch pedal sensor 24 occurs. And if the vehicle stops, the transmission stage of the manual transmission 80 is changed from the neutral stage to the drive stage, and a bottom signal of the clutch pedal sensor 24 occurs (S81), the controller 10 determines that the first restart condition is satisfied and restarts the engine 12 by running the operating motor 60 (S101).

That is, if the driver does not step on the clutch pedal after the vehicle stops, the driver engages the gear and presses the clutch pedal completely, then the controller 10 determines that the first restart condition is satisfied.

If the engine is restarted in accordance with the S50, S51, S60, S61, S70, S71, S80 and S81 step conditions, the controller 10 operates the operating motor 60 connected with the engine 12 to restart the engine 12.

After stopping the engine 12 in the step S40, the controller 10 activates the injector 50 to restart the engine 12 (S110) when the manual transmission 80 is engaged, the clutch is engaged, and a current engine rpm is higher than a predetermined rpm according to the output signal of the vehicle operation status detector 20 (S90)

For example, the predetermined rpm may be set to 500 rpm, but is not limited thereto. The predetermined rpm may be set through an experiment, such as rpm, to restart the engine 12 with only fuel injection without operation of an operating motor.

According to the ISG control method of a vehicle equipped with manual transmission according to an exemplary form of the present disclosure, the ISG function may be activated according to the first and second operation determination conditions, thereby fuel economy may be improved.

Also, regardless of whether the transmission stage of manual transmission is engaged or not, the engine stop interval may be extended relatively to improve the fuel consumption of the vehicle.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

| <Description of symbols> | |
|---|---|
| 10: controller | 12: engine |
| 20: vehicle operation status detector | 22: transmission sensor |
| 24: clutch pedal sensor | 26: brake pedal sensor |
| 28: vehicle speed sensor | 30: rpm sensor |
| 40: memory | 50: injector |
| 60: operating motor | 62: motor controller |
| 64: battery | 70: clutch |
| 80: transmission | |

What is claimed is:

1. An idle stop and go (ISG) control method for a vehicle provided with a manual transmission, the ISG control method comprising:
   determining, by a controller, whether a first operation determination condition is satisfied based on a bottom signal from a clutch pedal sensor, a brake pedal operation signal, and a first vehicle speed signal condition;
   determining, by the controller, whether a second operation determination condition is satisfied based on the bottom signal from the clutch pedal sensor, the brake pedal operation signal, and a second vehicle speed signal condition;
   stopping, by the controller, an engine of the vehicle, regardless of a transmission stage of the manual transmission, when the first operation determination condition or the second operation determination condition is satisfied;
   determining, by the controller, whether a first restart condition is satisfied based on a top signal or the bottom signal from the clutch pedal sensor; and
   restarting, by the controller, the engine by driving an operating motor connected with the engine when the first restart condition is satisfied.

2. The ISG control method of claim 1, further comprising:
   determining, by the controller, whether a second restart condition is satisfied based on an engagement signal from the clutch pedal sensor; and
   restarting the engine, by the controller, by operating an injector of the engine when the second restart condition is satisfied.

3. The ISG control method of claim 2, further comprising:
   detecting, by the controller, whether the transmission stage of the manual transmission is a neutral stage or a driving stage.

4. The ISG control method of claim 3, wherein:
   in the driving stage,
   the first restart condition is satisfied when the bottom signal from the clutch pedal sensor is output, and the transmission stage of the manual transmission is changed to the neutral stage and then changed to the driving stage.

5. The ISG control method of claim 3, wherein:
   in the neutral stage,
   the first restart condition is satisfied when the bottom signal from the clutch pedal sensor is output, and the transmission stage of the manual transmission is changed to the driving stage.

6. The ISG control method of claim 3, wherein:
   the first restart condition is satisfied when the bottom signal from the clutch pedal sensor is output, and a brake pedal release signal is received.

7. The ISG control method of claim 3, wherein:
   in the driving stage,
   the first restart condition is satisfied when the transmission stage of the manual transmission is changed to the neutral stage, and then the bottom signal from the clutch pedal sensor is turned off and the top signal from the clutch pedal sensor is output.

8. The ISG control method of claim 3, wherein:
   in the neutral stage,
   the first restart condition is satisfied when the bottom signal from the clutch pedal sensor is turned off, and the top signal from the clutch pedal sensor is output.

9. The ISG control method of claim 3, wherein:
   in the driving stage,
   the first restart condition is satisfied when the bottom signal from the clutch pedal sensor is turned off while the top signal from the clutch pedal sensor is output, and then the bottom signal from the clutch pedal sensor is output.

10. The ISG control method of claim 3, wherein:

in the neutral stage, the first restart condition is satisfied when the vehicle stops, the transmission stage of the manual transmission is changed to the drive stage, and the bottom signal from the clutch pedal sensor is output.

11. The ISG control method of claim 3, wherein:

in the driving stage, the second restart condition is satisfied when revolutions per minute (RPM) of the engine is higher than a predetermined RPM, and a signal from the clutch pedal sensor is in off.

12. The ISG control method of claim 1, wherein:

the first vehicle speed signal condition is satisfied when a current vehicle speed of the vehicle is lower than a predetermined first vehicle speed, and a recorded vehicle speed of the vehicle is higher than a predetermined second vehicle speed which is higher than the predetermined first vehicle speed.

13. The ISG control method of claim 12, wherein:

the second vehicle speed signal condition is satisfied when the current vehicle speed is lower than a predetermined third vehicle speed which is lower than the predetermined first vehicle speed, and the recorded vehicle speed is higher than a predetermined fourth vehicle speed which is higher than the predetermined third vehicle speed.

\* \* \* \* \*